US009898589B2

(12) United States Patent
Walline et al.

(10) Patent No.: US 9,898,589 B2
(45) Date of Patent: *Feb. 20, 2018

(54) CONTENT SHARING AND STORAGE OF A PLURALITY OF REMOTELY CONNECTED COMPUTING DEVICES IN PHYSICAL OR VIRTUALIZED SPACE

(71) Applicant: Dell Products, LP, Round Rock, TX (US)

(72) Inventors: Erin K. Walline, Pflugerville, TX (US); Liam B. Quinn, Austin, TX (US); Sean P. O'Neal, Austin, TX (US)

(73) Assignee: Dell Products, LP, Round Rock, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/473,508

(22) Filed: Mar. 29, 2017

(65) Prior Publication Data

US 2017/0206342 A1 Jul. 20, 2017

Related U.S. Application Data

(63) Continuation of application No. 14/674,962, filed on Mar. 31, 2015, now Pat. No. 9,641,593.

(51) Int. Cl.
| | | |
|---|---|---|
| G06F 15/16 | (2006.01) |
| G06F 21/10 | (2013.01) |
| H04L 29/08 | (2006.01) |
| H04M 17/00 | (2006.01) |
| G06F 21/62 | (2013.01) |
| G06F 21/60 | (2013.01) |
| H04L 29/06 | (2006.01) |

(52) U.S. Cl.
CPC ............ *G06F 21/10* (2013.01); *G06F 21/606* (2013.01); *G06F 21/6218* (2013.01); *H04L 67/06* (2013.01); *H04L 67/1097* (2013.01); *H04M 17/10* (2013.01); *H04L 67/42* (2013.01)

(58) Field of Classification Search
CPC .................................................. H04L 67/1097
See application file for complete search history.

(56) References Cited

U.S. PATENT DOCUMENTS

| 9,544,333 B2 * | 1/2017 | Walline .................. H04L 63/20 |
| 9,641,593 B2 * | 5/2017 | Walline .................. H04L 67/06 |
| 2014/0013433 A1 | 1/2014 | Turner |

* cited by examiner

*Primary Examiner* — Vivek Srivastava
*Assistant Examiner* — Nicholas Celani
(74) *Attorney, Agent, or Firm* — Prol Intellectual Property Law, PLLC; H. Kenneth Prol

(57) ABSTRACT

An information handling system includes a processor that executes instructions for a content sharing system having mixed operating system capabilities. The processor detects prepaired wireless connectivity remotely connected computing devices, and auto-initiates navigation accessibility within authorized remotely connected computing devices via the content sharing system. The information handling system also includes a display for a content sharing system desktop that includes representation of file structures corresponding to a plurality of remotely connected computing devices.

20 Claims, 7 Drawing Sheets

CONTENT SHARING AND STORAGE OF A PLURALITY OF REMOTELY CONNECTED COMPUTING DEVICES IN PHYSICAL OR VIRTUALIZED SPACE

This application is a continuation of prior application Ser. No. 14/674,962, entitled "Content Sharing and Storage of a Plurality of Remotely Connected Computing Devices in Physical or Virtualized Space," filed on Mar. 31, 2015, which is assigned to the current assignee hereof and is incorporated herein by reference in its entirety.

FIELD OF THE DISCLOSURE

The present disclosure generally relates to information handling systems, and more particularly relates to a thin computing system having mixed OS capabilities for execution of a content sharing system locally or via partial remote virtual computing and memory resources.

BACKGROUND

As the value and use of information continues to increase, individuals and businesses seek additional ways to process and store information. One option is an information handling system. An information handling system generally processes, compiles, stores, or communicates information or data for business, personal, or other purposes. Technology and information handling needs and requirements can vary between different applications. Thus information handling systems can also vary regarding what information is handled, how the information is handled, how much information is processed, stored, or communicated, and how quickly and efficiently the information can be processed, stored, or communicated. The variations in information handling systems allow information handling systems to be general or configured for a specific user or specific use such as financial transaction processing, airline reservations, enterprise data storage, or global communications. In addition, information handling systems can include a variety of hardware and software resources that can be configured to process, store, and communicate information and can include one or more computer systems, graphics interface systems, data storage systems, networking systems, and mobile communication systems. Information handling systems can also implement various virtualized architectures. Data and voice communications among information handling systems may be via networks that are wired, wireless, or some combination. In some instances, users may operate via multiple computing devices. In other instances, multiple users on multiple computing devices may want to collaborate and share data. Coordination of a wide variety of content from a variety of devices that may have disparate hardware requirements, software architecture, or distinct operating systems (OS) may be challenging.

BRIEF DESCRIPTION OF THE DRAWINGS

It will be appreciated that for simplicity and clarity of illustration, elements illustrated in the figures are not necessarily drawn to scale. For example, the dimensions of some elements may be exaggerated relative to other elements. Embodiments incorporating teachings of the present disclosure are shown and described with respect to the drawings herein, in which.

The use of the same reference symbols in different drawings indicates similar or identical items.

DETAILED DESCRIPTION OF THE DRAWINGS

The following description in combination with the figures is provided to assist in understanding the teachings disclosed herein. The description is focused on specific implementations and embodiments of the teachings, and is provided to assist in describing the teachings. This focus should not be interpreted as a limitation on the scope or applicability of the teachings.

Figure 1:
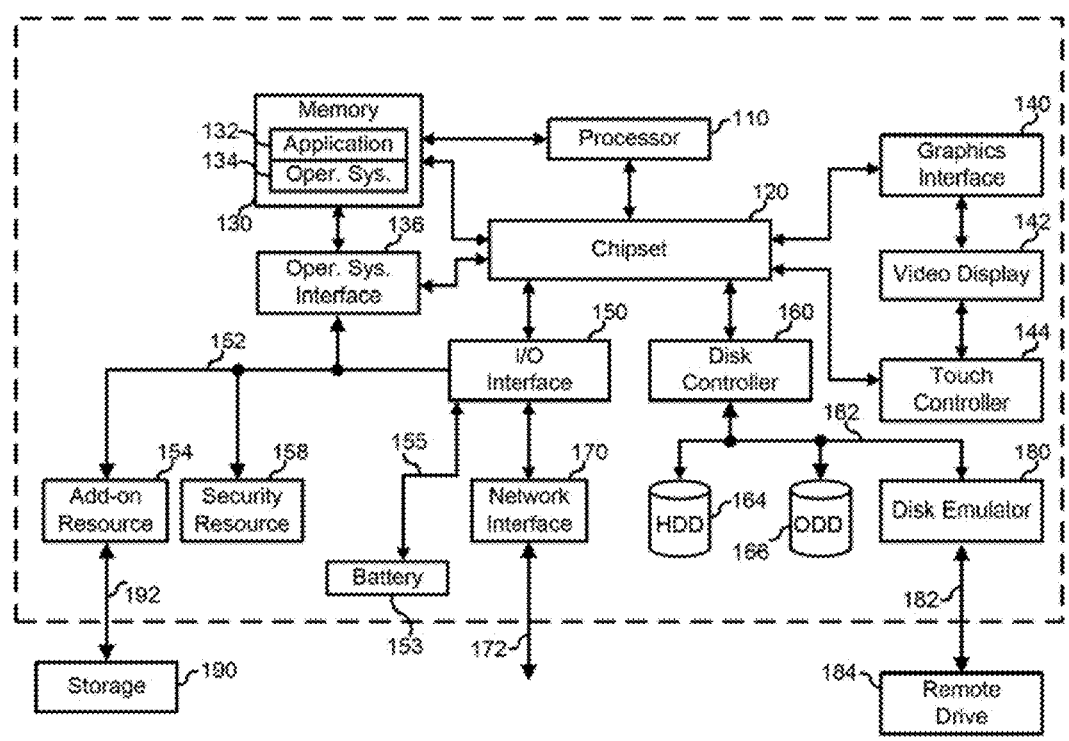
FIG. 1 is a block diagram illustrating an information handling system according to an embodiment of the present disclosure.

FIG. 1 illustrates a generalized embodiment of information handling system 100 for use with the present disclosures in multiple capacities. For purposes of this disclosure information handling system 100 can include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, information handling system 100 can be a personal computer, a laptop computer, a smart phone, a tablet device or other consumer electronic device, a network server, a network storage device, a switch router or other network communication device, or any other suitable device and may vary in size, shape, performance, functionality, and price. Further, information handling system 100 can include processing resources for executing machine-executable code, such as a central processing unit (CPU), a programmable logic array (PLA), an embedded device such as a System-on-a-Chip (SoC), or other control logic hardware. Information handling system 100 can also include one or more computer-readable medium for storing machine-executable code, such as software or data. Additional components of information handling system 100 can include one or more storage devices that can store machine-executable code, one or more communications ports for communicating with external devices, and various input and output (I/O) devices, such as a keyboard, a mouse, and a video display. Information handling system 100 can also include one or more buses operable to transmit information between the various hardware components.

Information handling system 100 can include devices or modules that embody one or more of the devices or modules described above, and operates to perform one or more of the methods described above. Information handling system 100 includes a processor 110, a chipset 120, a memory 130, a graphics interface 140, a disk controller 160, a disk emulator 180, an input/output (I/O) interface 150, and a network interface 170. Processor 110 is connected to chipset 120 via a processor interface. Processor 110 is connected to memory 130 via a memory bus. Memory 130 is also connected to chipset 120 via the same or another memory bus. Graphics interface 140 is connected to chipset 110 and provides a video display output to a video display 142. Video display 142 is also connected to touch controller 144 and may be connected to chipset 120 via touch controller interface. In a particular embodiment, information handling system 100 includes separate memories that are dedicated to processor 110 via separate memory interfaces. An example of memory 130 includes random access memory (RAM) such as static RAM (SRAM), dynamic RAM (DRAM), non-volatile RAM (NV-RAM), or the like, read only memory (ROM), another type of memory, or a combination thereof. Memory 130 can store, for example, at least one application 132 and operating system 134. Operating system 134 includes operating system code operable to detect resources within information handling system 100, to provide drivers for the resources, initialize the resources, to access the resources, and to support execution of the at least one application 132. Operating system 134 has access to system elements via an operating system interface 136. Operating system interface 136 is connected to memory 130.

Additionally, information handling system 100 may execute instructions for operating system conversion protocols via a processor 110 or chipset 120 to enable files from multiple remotely connected computing devices having a disparity of hardware, software architecture, and operating system types to be interpreted and successfully operated with by operating system 134. For example, information handling system 100 may run Linux kernel drivers with modules for a variety of OS systems and related file systems such as MS Windows, Apple OS, Android and similar operating systems for connectable computing devices including phones, tablet computers, laptops, gaming systems, fitness devices, smart watches, wearable computing devices, home or office environmental computing systems and the like as would be understood by those of skill in the art. These kernel drivers for the OS system of the host 134 for the content sharing system of the present disclosures are available to communicate and interpret alternate OS systems and file structures in remotely connected computing devices to the content sharing system. For a variety of OS systems, conversion of certain file types may also be needed for aggregation or file transfer functions of the content sharing system of the present disclosures example embodiments. In other embodiments, information handling system 100 may communicate, interpret, or execute content files from a variety of source computing devices via conversion to a common file type as is understood by those of ordinary skill in the art which may be utilized in functions of aggregation and file transfer exchanges done via the content sharing system of several embodiments in the present disclosure. In an example, a common file type may be conversion to IP protocol such as FTP.

Graphics interface 140, disk controller 160, I/O interface 150, and touch controller 144 are connected to chipset 120 via interfaces that may be implemented, for example, using a Peripheral Component Interconnect (PCI) interface, a PCI-Extended (PCI-X) interface, a high-speed PCI-Express (PCIe) interface, another industry standard or proprietary communication interface, or a combination thereof. Chipset 120 can also include one or more other I/O interfaces, including an Industry Standard Architecture (ISA) interface, a Small Computer Serial Interface (SCSI) interface, an Inter-Integrated Circuit ($I^2C$) interface, a System Packet Interface (SPI), a Universal Serial Bus (USB), another interface, or a combination thereof.

Disk controller 160 is connected to chipset 120. Disk controller 160 includes a disk interface 162 that connects the disc controller to a hard disk drive (HDD) 164, to an optical disk drive (ODD) 166, and to disk emulator 180. An example of disk interface 162 includes an Integrated Drive Electronics (IDE) interface, an Advanced Technology Attachment (ATA) such as a parallel ATA (PATA) interface or a serial ATA (SATA) interface, a SCSI interface, a USB interface, a proprietary interface, or a combination thereof. Disk emulator 180 permits a solid-state drive 184 to be connected to information handling system 100 via an external interface 182. An example of external interface 182 includes a USB interface, an IEEE 1194 (Firewire) interface, a proprietary interface, or a combination thereof. Alternatively, solid-state drive 184 can be disposed within information handling system 100.

In yet other embodiments, disk emulator 180 may work in connection with a remote desktop protocol or similar memory virtualization protocol to operate a remote virtual storage device as if it were a device internal to computing system 100. In such a case, an external interface may be connected form disk emulator 180 via a portion of network interface 170. Connection may be to network connected storage via a wireless or wired network connection, for example, a WPAN/WLAN or other network connection.

I/O interface 150 is connected to chipset 120. I/O interface 150 includes a peripheral interface 152 that connects the I/O interface to an add-on resource 154, and to a security resource 158. Peripheral interface 152 can be the same type of interface as connects graphics interface 140, disk controller 160, and I/O interface 150 to chipset 120, or can be a different type of interface. As such, I/O interface 150 extends the capacity of such an interface when peripheral interface 152 and the I/O channel are of the same type, and the I/O interface translates information from a format suitable to such an interface to a format suitable to the peripheral channel 152 when they are of a different type. Add-on resource 154 can include a data storage system, an additional graphics interface, a network interface card (NIC), a sound/video processing card, another add-on resource, or a combination thereof. As an example, add-on resource 154 is connected to data storage system 190 via data storage system interface 192. Add-on resource 154 can be on a main circuit board, on separate circuit board or add-in card disposed within information handling system 100, a device that is external to the information handling system, or a combination thereof.

Network interface 170 represents a NIC disposed within information handling system 100, on a main circuit board of the information handling system, integrated onto another component such as chipset 120, in another suitable location, or a combination thereof. Network interface 170 is connected to I/O interface 150. Network interface device 170 includes network channel 172 that provides an interface to devices that are external to information handling system 100. In a particular embodiment, one or more network channels 172 are of a different type than peripheral channel 152 and network interface 170 translates information from a format suitable to the peripheral channel to a format suitable to external devices. An example of network channels 172 includes InfiniBand channels, Fibre Channel channels, Gigabit Ethernet channels, proprietary channel architectures, or a combination thereof suitable for establishing WPAN, WLAN, WAN or other network connections. Network interface 170 may be a wireless interface or a wired interface in various embodiments. Network channels 172 can be connected to external network resources (not illustrated). The network resource can include another information handling system, a data storage system, another network, a grid management system, another suitable resource, or a combination thereof.

Figure 2:
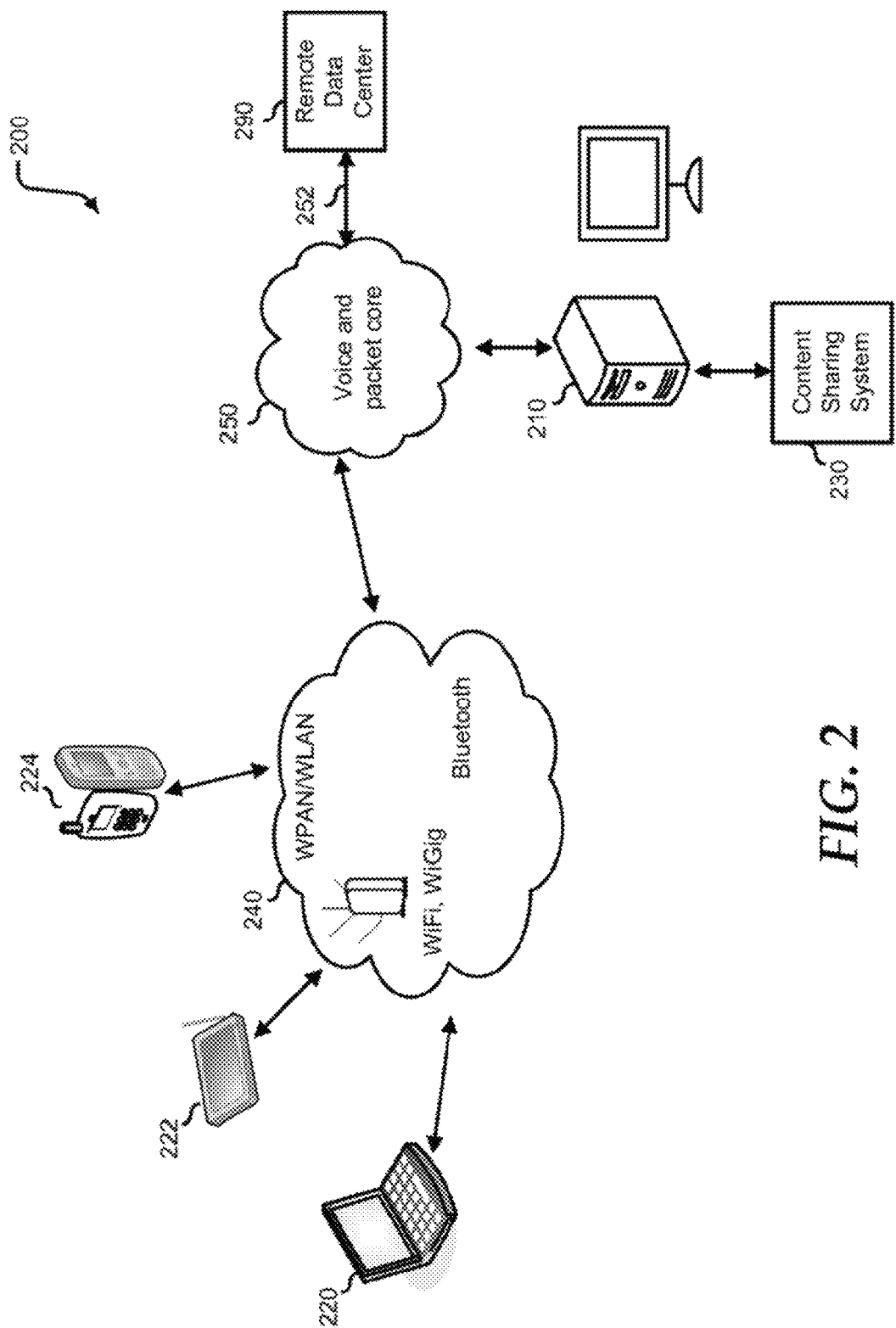
FIG. 2 is a block diagram illustrating a networked information handling system having some or all of a content sharing system, and a plurality of remotely connected computing devices according to an embodiment of the present disclosure.

FIG. 2 illustrates a generalized network 200 that can include one or more information handling systems. In a particular embodiment, network 200 includes networked mobile information handling systems 220, 222, and 224, wireless network access points, and multiple wireless connection link options. Systems 220, 222, and 224 represent a variety of computing resources of network 200 including client mobile information handling systems. Additional resources may be available within network 240 including data processing servers, network storage devices, local and wide area networks, or other resources as needed or desired. As specifically depicted, systems 220, 222, and 224 may be a laptop computer, tablet computer, or smartphone device. These user mobile information handling systems 220, 222, and 224, may access network 240. The user mobile information handling systems 220, 222, and 224 may also access a wider network via a macro-cellular network 250. Further resources may be available including additional data processing servers such as information handling system 210, remote data centers 290, additional network storage devices, additional local and wide area networks, or other resources as needed or desired. For example, network 240 may be a wireless local area network (WLAN), a wireless personal area network (WPAN), or a wireless wide area network (WWAN). Since WPAN or WiFi Direct Connection and WWAN networks can functionally operate similar to WPAN/WLANs, they may be considered as wireless local area networks (WPAN/WLANs) for purposes herein. Wireless communications across wireless local area network 240 may be via standard protocols such as IEEE 802.15.1 Bluetooth SIG, IEEE 802.11 Wi-Fi, IEEE 802.11ad WiGig, IEEE 802.15 WPAN or similar wireless network protocols. Alternatively, other available wireless links within network 200 may include macro-cellular connections via one or more protocols including 2G standards such as GSM, 2.5G standards such as GSM EDGE and GPRS, 3G standards such as W-CDMA/UMTS and CDMA 2000, or 4G standards such as WiMAX, LTE, and LTE Advanced. Mobile information handling systems 220, 222, and 224 may connect to the external network via base station locations at service providers. Links to WPAN/WLAN 240 may be via these macro-cellular connections as well or via other connections as is understood.

In other aspects, components of a WPAN/WLAN 240 may be connected by wireline or Ethernet connections (not shown) to the wider external network 250 with access to additional resources as described above including additional information handling systems 210 for remote processing or remote data centers 290. For example, wireless network access points may be connected to a wireless network controller and an Ethernet switch. Connection between the wireless network 240 and a wider network 250 including information handling system 210 and remote data center 290 may be via Ethernet or another similar connection to the world-wide-web, a WAN, a LAN, another WPAN/WLAN, or other network structure. Additional resources such as information handling system 210 and remote data center 290 may host some or all of a content sharing system such as described in the present disclosure. In other aspects, a host information handling system 210 and/or remote data center 290 may connect to WPAN/WLAN 240 in other embodiments. Such a connection via WPAN/WLAN access point/Ethernet switch or via macrocellular connections to the external network may be a backhaul connection. The access point may be connected to one or more wireless access points in the WPAN/WLAN before connecting directly to a mobile information handling system or may connect directly to one or more mobile information handling systems 220, 222, and 224.

The voice and packet core network 250 may access externally accessible computing resources such as information handling system 210 and connect to remote data centers 290 as described. The voice and packet core network 250 may contain multiple intermediate web servers or other locations with accessible data (not shown). Remote data center 290 may include web servers or resources within a cloud environment. For example, remote data centers can include additional information handling systems, data processing servers, network storage devices, local and wide area networks, or other resources as needed or desired. Having such remote capabilities may permit fewer resources to be maintained at the client mobile information handling systems 220, 222, and 224 allowing streamlining and efficiency within those devices. Similarly, remote data center 290 permits fewer resources to be maintained in other parts of network 200 such as at networked information handling system 210.

In an example embodiment, the cloud or remote data center 290 may run hosted applications for systems 220, 222, and 224 or for other networked systems such as information handling system 210. This may occur by establishing a virtual machine application executing software to manage applications hosted at the remote data center 290. Mobile information handling systems 220, 222, and 224 or information handling system 210 may be adapted to run one or more applications locally, and to have hosted applications run in association with the local applications at remote data center 290. The virtual machine application may serve one or more applications to each of user mobile information handling systems 220, 222, and 224 and information handling system 210. Thus, as illustrated, systems 210, 220, 222, and 224 may be running applications locally while requesting data objects related to those applications from the remote data center 290 via wireless network.

For example, a content sharing system application may run locally at system 210. The content sharing system application may be associated with a host application that represents a content sharing system server. In another example, a data storage client application such as Microsoft Sharepoint may run on system 210. It may be associated with a host application running at remote data center 290 that represents a Sharepoint data storage server. In a further example, a web browser application may be operating at system 210. The web browser application may request web data from a host application that represents a hosted website and associated applications running at remote data center 290. Similarly, local applications may be run on remotely connected information handling systems 220, 222, and 224 and associated with a host application on information handling system 210 or remote data center 290 or some combination.

To communicate within the network 200, the systems 220, 222, and 224 each have a wireless interface module or wireless adapter, hereinafter referred to as a wireless adapter. The wireless adapters are operable to each provide a wireless radio frequency interface to transmit and receive voice and data between the respective systems 220, 222, and 224 and one or more external networks via wireless network 240, 250, or a wireline connection.

The wireless adapters can represent add-in cards, wireless network interface modules that are integrated with a main board of respective systems 220, 222, and 224 or integrated with another wireless network interface capability, or any combination thereof. In an embodiment the wireless adapters may include one or more radio frequency subsystems including transmitters and wireless controllers for connecting via a multitude of wireless links. In an example embodiment, a mobile information handling system may have a transmitter for WiFi or WiGig connectivity and one or more transmitters for macro-cellular communication. The radio frequency subsystems include wireless controllers to manage authentication, connectivity, communications, power levels for transmission, buffering, error correction, baseband processing, and other functions of the wireless adapters.

The wireless adapters may be capable of connecting via a WPAN/WLAN 240 or a macro-cellular network (WWAN) via a variety of the wireless standards or via wireline as described above. Each of the wireless adapters for client mobile information handling systems 220, 222, and 224 are uniquely identified on network 200 via one or more unique identifiers permitting authentication and access. For example, the wireless device can each be identified by one or more Subscriber Identity Modules (SIM), one or more of a media access control (MAC) address, an Internet protocol (IP) address, a worldwide name (WWN), Bluetooth UUID, or another unique identifier as needed or desired. Additional examples may assign a user name and password as a unique identifier in some example embodiments. Association of a user and a wireless interface module of a user information handling system may be made via communications across a networking control plane. For example, a user information handling system may be associated with a user via communication with a database such as Home Subscriber Server (HSS), Active Directory or similar database.

The wireless adapters may operate in accordance with any wireless data communication standards. To communicate with wireless local area network 140, standards including Bluetooth SIG, IEEE 802.11 WLAN standards, IEEE 802.15 WPAN standards, WWAN such as 3GPP or 3GPP2, or similar wireless standards may be used. The WPAN/WLAN network 240 may provide connectivity via Bluetooth, WiFi, or WiGig for example. The wireless network 240 may have a wireless mesh architecture in accordance with mesh networks described by the above wireless data communications standards or similar standards. Wireless links may also connect to the external network via a WPAN, WLAN, or similar wireless switched Ethernet connection. The wireless data communication standards set forth protocols for communications and routing via access point, as well as protocols for a variety of other operations. Other operations may include handoff of client devices moving between nodes, self-organizing of routing operations, or self-healing architectures in case of interruption.

An information handling system 210 networked with a plurality of information handling systems 220, 222, and 224 as illustrated in network 200 may operate a content sharing system 230 according to various embodiments. The content sharing system 230 may be series of executable code instructions operating on a processor in information handling system 210. In other embodiments, content sharing system 230 may be code executable via a processing system on one or more a mobile information handling systems such as 220, 222, and 224 or may be remotely operated via remote data center 290. Content sharing system 230 in other embodiments may be all or partly hard coded into an application specific processing system or may be distributed among several different information handling systems for processing and execution. Information handling system 210 and content sharing system 230 may be connected via macrocellular network, a wireline connection, a wider voice and packet core network 250 or may be directly connected to WPAN or WLAN network 240 or any combination of the same. As described above, content sharing system 230 may have mixed operating system capabilities in that plug-ins or other processor commands may run via an content sharing system operating system allowing interfacing by the content sharing system 230 with remotely connected information handling systems 220, 222, and 224 as discussed further below. Information handling system 230 may be connected to display 242 for displaying a content sharing system desktop for interfacing, communication and executing commands to remotely connected information handling systems such as 220, 222, and 224.

Content sharing system 230 permits normalization of communication, functions, and sharing of files and data among information handling systems 220, 222, and 224 via a central information handling system 230. Files on information handling systems 220, 222, and 224 may be accessed, navigated and aggregated at a remote data center 290 or in remote storage by the content sharing system 230. Operating system conversion for data types and for commands permits control and navigation of remotely connected information handling systems 220, 222, and 224 from the content sharing system 230 despite differing hardware, system architectures, disparate operating systems and the like. Each remotely connected information handling system such as example systems 220, 222, and 224 may be represented on display screen 242 in the content sharing system desktop with a device environment-representative window. The device environment-representative window corresponding to each remotely connected information handling system such as 220, 222, and 224 may be used in embodiments to assist with communication with the remotely connected information handling system 220, 222, and 224. Additionally, device environment-representative windows may be used for navigation and control of applications and files with each corresponding respective remotely connected information handling systems 220, 222, and 224. By use of such a content sharing system 230 for communication, control, and operation of remotely connected information handling systems 220, 222, and 224, collaboration among the connected computing devices and aggregation of files dispersed among the computing devices may be achieved in a more seamless and efficient manner on one content sharing desktop. Information handling system 210 may operate as a thin shell OS client with addition computing and storage for conversion among operating systems and architectures managed remotely via a remote data center with a plurality of servers such as shown at 290.

In various embodiments discussed in additional detail below, computing device environment-representative windows may display application and data file trees showing architecture of files and executable code located on remotely connected information handling systems 220, 222, and 224. In yet other embodiments, images of local desktops including icons and control soft keys and other features may be replicated in the device environment-representative windows of the content sharing system 230 for one or more information handling systems 220, 222, and 224 where such a replication is possible or applicable. In some instances, remotely connected information handling systems 220, 222, and 224 may not have any substantial desktop or navigation system. For example, this may be the case for wearable technology such as a fitness computers, home control systems, or other information handling systems that may be remotely connected. In yet other circumstances, desktop images or icons of remotely connected information handling systems 220, 222, and 224 may be proprietary or unwieldy to replicate in computing device environment-representative windows and a file tree or other similar structure may be used instead.

More seamless control amongst varying remotely connected information handling systems 220, 222, and 224 may happen in execution of commands, communications, or navigation of system applications and data in each information handling systems 220, 222, and 224 via the content sharing system 230. For example, in some embodiments, files may be transferred among remotely connected information handling systems 220, 222, and 224 with simple drag-and-drop or shortcut key functionality by collection of the file or data from a transferor computing device to the content sharing system 230 and stored locally in storage at information handling system 210 or stored remotely at a remote data center 290. The content sharing system 230 may convert the file or data to an architecture or format useable by the content sharing system 230 or may convert the file or data to a format for the transferee system as necessary. In certain embodiments, the content sharing system desktop will indicate by visual cues that a file transfer has taken place or is taking place. Change in color or highlighting of a file may indicate the change in file status for example. Additional visual cues will indicate which environment is being used when interfacing with the content sharing system desktop via display 242 or via a remotely connected information handling system 220, 222, or 224 in some embodiments.

In other aspects, the content sharing system 230 may aggregate files and data from a plurality of remotely connected information handling systems 220, 222, and 224. Data and files aggregated from a plurality of remotely connected information handling systems such 220, 222, and 224 may come from a variety of system hardware types, system architectures, or disparate operating systems and file or data formats. The content sharing system 230 may interface with the remotely connected information handling systems such as 220, 222, and 224. Upon obtaining access, navigation of some or all files on information handling systems 220, 222, and 224 will allow aggregation of permitted files to one shared drive associated with the content sharing system 230. This may be a shared local drive at information handling system 210, may be a shared virtual drive such as at remote data center 290, or may be any combination. The content sharing system 230 may use systems to organize aggregated data from the plurality of remotely connected information handling systems. In this way, navigation of a complete set of data or files from the plurality of remotely connected information handling systems such as 220, 222, and 224 is more seamless and efficient.

Additionally, the content sharing system 230 may organize aggregated files from a plurality of remotely connected information handling systems such as 220, 222, and 224 in a variety of ways. For example, files and data may be organized by OS type from which the file or data was retrieved, or by computing device from which the data or files were retrieved. In other examples, geotags or other location metadata may be used to organize files and data aggregated from a plurality of remotely connected information handling systems such as 220, 222, and 224 by geographic region or location. For example, image, video, or audio data and files may be organized from the plurality of remotely connected information handling systems such as 220, 222, and 224 by location where the files were recorded. Similarly, aggregated data may be organized by chronology in another example of this aspect of the content sharing system 230.

In yet other examples, data may be organized according to how files and content are related to categories selected by the user or created by the user via the content sharing system 230. For example, categories that are designated personal, work-related, kid-related, or related other activity related may be used to organize aggregated files in shared storage by the content sharing system 230. Categorization criteria may be varied in embodiments of the content sharing system aggregation aspect as is understood by those of skill in the art. Categories by file relatedness to usage categories may assess factors such as where data or files come from, the type of files, identifying metadata for times, locations and other aspects of a file, or identifying content of the files. For example, a work based remotely connected information handling system may contain files that are mixed work, personal, kids, and other activities. The source being a work computing device may weigh heavily towards a work categorization, however a geotag or time stamp may indicate that a file was created at a place or time not typically associated with work. A file type may also play a factor in determining a categorization. For example a spreadsheet, word processing document or other file type may be more typically associated with a user's work than a video or photographic image. This would depend on designations of the user or a learned trend of factors when categorizing relatedness to usage of aggregated files. Accordingly, the content sharing system 230 may be able to further access the content of the files or data from remotely connected information handling systems such as 220, 222, and 224 to determine additional context for file categorization. For example, image or face recognition may be used to identify individuals in files. Scans of documents may identify names of an employer, a family member, an organization name, project names, descriptions, titles, keywords or other information for classification purposes. In a shared memory environment, aggregated data from a plurality of remotely connected information handling systems such as 220, 222, and 224 may then be reviewed and managed according to relatedness categorization. Additionally, operations may be performed on the aggregated files from the content sharing system location via remote desktop protocol or similar virtualization techniques. In other embodiments, operations, navigation of files including aggregated files may also be managed by a user from one of the remotely connected information handling systems such as 220, 222, and 224. In other words, access to or control of the content sharing system 230 under certain embodiments may be granted to one or more remotely connected information handling systems such as 220, 222, and 224 via a similar virtualization protocol.

In one aspect of the present disclosure, automatic access by the content sharing system may be requested or granted upon detection of remote connection by a remotely connected information handling systems such as 220, 222, and 224 connecting to a network 240 monitored by content sharing system 230. For example, the content sharing system 230 may poll a monitored network, such as a wireless network 240 to monitor the network for remotely connected or connecting information handling systems 220, 222, and 224 available for pairing with the wireless network and for pairing with the content sharing system. In some embodiments, remotely connected information handling systems such as 220, 222, and 224 may have been pre-arranged as targets for content sharing by the content sharing system 230. The remotely connected information handling systems such as 220, 222, and 224 may have code embedded in other embodiments to allow content sharing system 230 to initiate access automatically upon connection with network 240 monitored by the content sharing system. Content sharing system 230 may be set to monitor any size network including one or more WPANs, WLANs, or other networks discussed. Upon approvals being granted by the remotely connected information handling systems such as 220, 222, and 224 and by the content sharing system 230, navigation and access to files and content may be permitted via a content sharing system desktop. Security for pre-approved content sharing may streamline the access and navigation process for the content sharing system 230 in some embodiments. The content sharing system 230 may then provide device environment-representative windows on the content sharing desktop to assist in navigation of the plurality of remotely connected information handling systems such as 220, 222, and 224 despite varying OS, architecture, and hardware.

In another aspect of the present disclosure, the content sharing system 230 may enable remotely connecting devices such as 220, 222, and 224 to auto-pair wirelessly to the host information handling system 210 or remote data center 290 operating the content sharing system in some embodiments. The auto-pairing, which includes pairing to a wireless network and auto-initiation of access to the content sharing system, may be pre-approved and permit approved remotely connecting information handling systems to efficiently be integrated into the content sharing system 230. Pre-approval may occur via data or code provided to some remotely connecting information handling systems 220, 222, and 224 in advance of connecting to a network 240 monitored or associated with the content sharing system. Auto-pairing may also provide efficient and pre-approved access to network 240 by providing passcodes or other information needed to pair with the wireless network in other embodiments. Similarly, connection requirements to pair a remotely connected information handling system such as 220, 222, and 224 with the content sharing system 230 may be provided to permit auto-initiation of access between the content sharing system 230 and the connecting device. Auto-pairing and auto-initiation are discussed further herein.

In another aspect, automatic execution of an aggregation of files may take place upon remote connection by a plurality of information handling systems such as 220, 222, and 224 to a content sharing system 230 for one or more file types to be aggregated to allow a user to compare and review files. Review of categorized files, for example, may be desirable to determine the scope of data and files stored across the systems or determine differences between similar or parallel files stored among the remotely connected information handling systems such as 220, 222, and 224. Other automatic execution of applications and data files are also contemplated upon remote connection and confirmed accessibility of the content sharing system 230 and remotely connected information handling systems such as 220, 222, and 224.

In other aspects of the present disclosure, upon determination that one or more remotely connected information handling systems such as 220, 222, and 224 are accessible via the content sharing system 230, the content sharing system 230 may auto-execute certain files and data via applications on one or more information handling systems connected within the WPAN or WLAN network. For example, upon connecting to the content sharing system 230, commands may be established to automatically operate an application and execute one or more files. For example, as preferences are learned by the system, a media player may determine favored music file lists from among the one or more remotely connected information handling systems such as 220, 222, and 224 and to play music from that computing device.

In yet other aspects of the present disclosure, remotely connected information handling systems 220, 222, and 224 may be owned or operated by a plurality of users or organizations. In some cases, content sharing system 230 may be used with remotely connected information handling systems 220, 222, and 224 under control of one user. In other instances, remotely connected information handling systems 220, 222, and 224 may be from a variety of users. For example, a group of collaborative users from an organization may use the content sharing system 230. Use of such the content sharing system 230 for communication, control, and operation of remotely connected information handling systems 220, 222, and 224 may pose problems with respect to security, privacy or other considerations when devices originate from multiple sources. As a result, the content sharing system may be set to classify remotely connected information handling systems 220, 222, and 224 according to roles they play for their user or users. Based on the roles played by remotely connected information handling systems 220, 222, and 224, the content sharing system 230 may implement role-based policies to limit functions of the content sharing system such as those functions described above. Setting role-based policies may be according to specific file types, metadata, expected purpose of files, identified users, or purposes of remotely connected computing devices as well as other factors described further below. Role-based policy settings may come from a policy control interface or may be received from remotely connected information handling systems 220, 222, and 224 as set by IT administrators for those devices.

Figure 3:
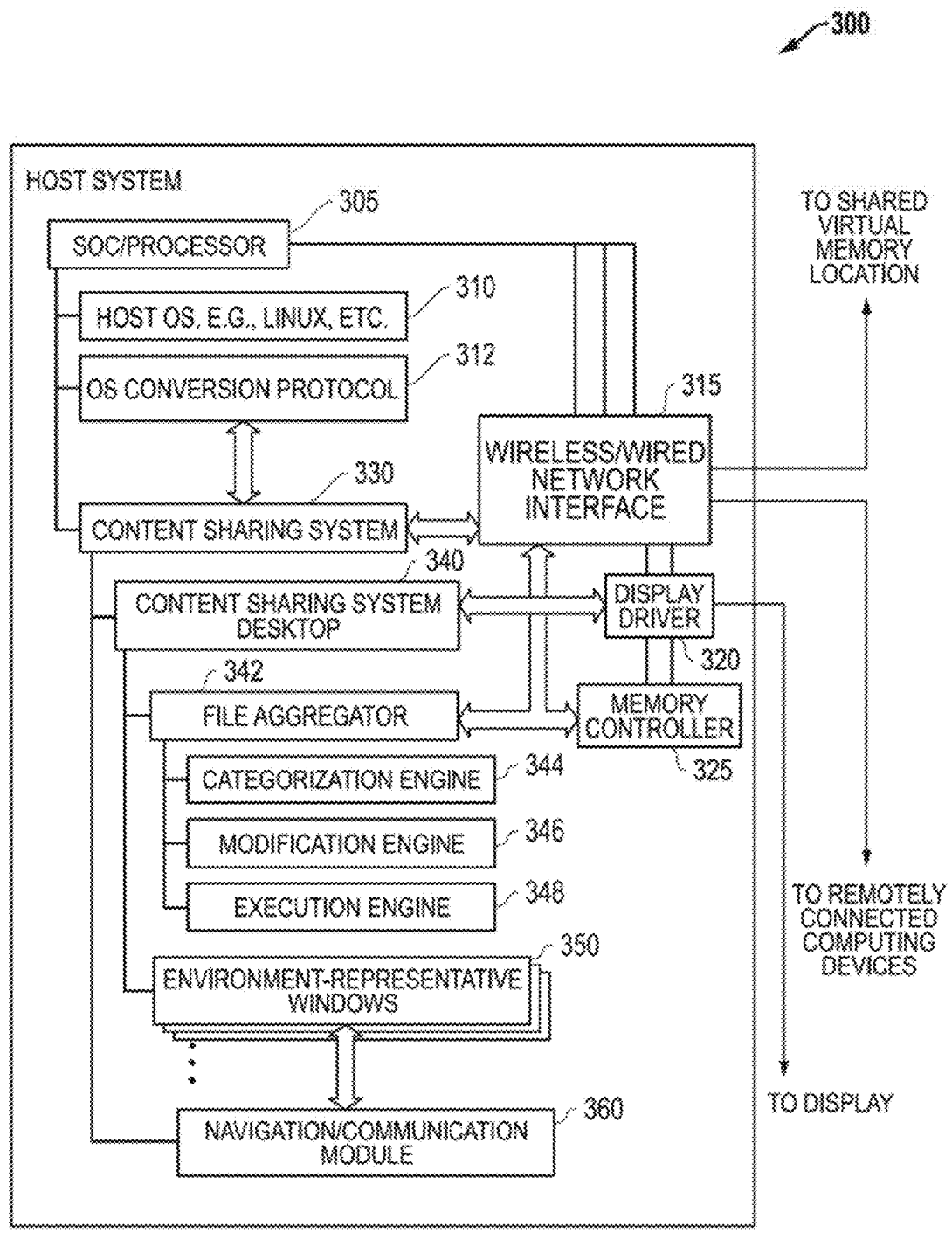
FIG. 3 is a block diagram illustrating a content sharing system according to one or more embodiments of the present disclosure.

FIG. 3 is a block diagram showing a hosted content sharing system 300 according to an embodiment of the present disclosure. The content sharing system host has a processor or an application specific processor 305 for executing instructions to operate the content sharing system 330 on host 300. Processor 305 may be connected via one or more buses as described above to components including a wireless or wired network interface device 315, a display driver 320, or a memory controller 325.

In an example embodiment, the processor 305 operates a host operating system (OS) 310 that may include Linux or another available operating system. In some embodiments, host operating system 310 may be a thin OS with association with a host application at a remote data center. Content sharing system host 300 further includes an OS system conversion protocol 312. The OS conversion protocol 312 may include executable code instructions to detect an operating system or system architecture of remotely connected information handling systems or their files. The OS conversion protocol will enable the files to be accessible by the content sharing system 330, navigated and communicated with via a navigation/communication module 360 of the content sharing system 330, and for functions to be performed or commands executed on the files from various remotely connected information handling systems. For example, a file aggregator 342 may collect and aggregate all or a subset of available files from the various remotely connected information handling systems to a local or remote shared memory location. A categorization engine 344 may compare files from the various remotely connected information handling systems based on location, timestamps, sources of data, file types, cues from metadata and content and other factors to categorize and arrange the aggregated files in a variety of ways as described.

Modification engine 346 may allow the content sharing system 330 to make modifications to the aggregated files in shared storage and reflect those changes on the remotely connected information handling systems where permitted. For example, a file may be copied between two environment-representative windows 350 of the information handling system via a copy short cut command or a drag and drop in the content sharing system desktop 340. This copying may be done via a shared storage system and with OS conversion protocol to transfer the file. In other embodiments, a transfer or copy function may be executed directly between remotely connected computing devices.

Execution engine 348 allows the content sharing system 330 to execute files or applications in shared storage or on remotely connected information handling systems via commands from the content sharing systems 330. In an embodiment, commands may come through the content sharing system 330 from other remotely connected information handling systems where permitted. For example, an auto execution of certain files may be set to run upon detected connection of remotely connected information handling systems with the content sharing system 330 or after aggregation of files by the file aggregator 342. In an example embodiment, a play list of audio files may be aggregated from a plurality of remotely connected information handling systems and an auto play feature may be initiated from the aggregated audio files. Play may proceed by favorites or preferences set by a user. In another example, data may be collected from one or more wearable fitness devices and analysis software may be auto executed upon detection of interfacing with the content sharing system 330. Viewable fitness data, both new and historic, may be auto-executed for viewing with a fitness tracking application.

The OS conversion protocol 312 may include use of kernel drivers for the OS system of the host 300. Additionally, one or more media sharing programs are available for use, all or in part, as an OS conversion protocol to communicate and interpret alternate OS systems and file structures for remotely connected information handling systems. For a variety of OS systems, conversion of certain file types may also be needed for functions such as aggregation or file transfer which will also be accomplished by an OS conversion protocol 312. In some embodiments, content sharing system 330 may communicate, interpret, or execute content files from a variety of remotely connected source computing devices via conversion to one or more common file types. The functions of aggregation and file transfer exchanges may then be done via the content sharing system according to several embodiments in the present disclosure. For example, conversion to IP protocol such as FTP may be appropriate for certain file types.

Display driver 320 will drive a display associated with the host 300 or may drive a remote display. Content sharing system 330 may have a module for establishing a content sharing system desktop 340 that may be displayed in an attached display device or a remote display. In other embodiments, the content sharing system desktop 340 generated by the content sharing system 330 may be displayed on a remotely connected information handling system, for example, via a wireless or wired network interface. An example embodiment of a content sharing system desktop 340 is discussed further below but will include a plurality of computing device environment-representative windows 350 corresponding to remotely connected information handling systems accessed by the content sharing system 330. Those device environment-representative windows 350 may include a file tree for navigation of files available to the content sharing system 330. Navigation/communication module 360 allows for interaction with the device environment-representative windows 350 to navigate with or communicate commands with the applications on remotely connected information handling systems. Additionally, navigation/communication module 360 facilitates interaction with the device environment-representative windows 350 to interface with aggregated files in shared storage via memory controller 325 or network interface 315. Navigation/communication module 360 may be instrumental along with host OS 310 and processor 305 in administering limitations on the content sharing system based on role-based policies determined to provide ways to wall of sets of files and content from content sharing functions or from specific role-classified remotely connected computing devices.

In another embodiment, images of a desktop from one or more remotely connected information handling systems is partially or completely replicated in a corresponding device environment-representative window 350 of the content sharing system desktop 340. In other embodiments, visual cues in the content sharing desktop and device environment-representative windows may be used to identify remotely connected computing device role classifications. In some embodiments, visual cues in the content sharing system desktop and device environment-representative windows may indicate application of content sharing system limitations according to role-based policies.

Memory controller 325 may connect externally directly or via a network interface with a virtual remote memory as shown or may interface with a local shared memory storage. The virtual remote memory or local memory may serve as a shared memory for the content sharing system. Shared memory may be used for navigation of files from remotely connected information handling systems by the content sharing system 330. Additionally, a shared memory, local or remote, may be used by a file aggregator 342, categorization engine 344, modification engine 346, and execution engine 348 during aggregation of files from a plurality of remotely connected information handling systems. Modification engine 346 and execution engine 348 may also directly communicate via navigation/communication module 360 with applications or files on remotely connected information handling systems as well.

Figure 4:
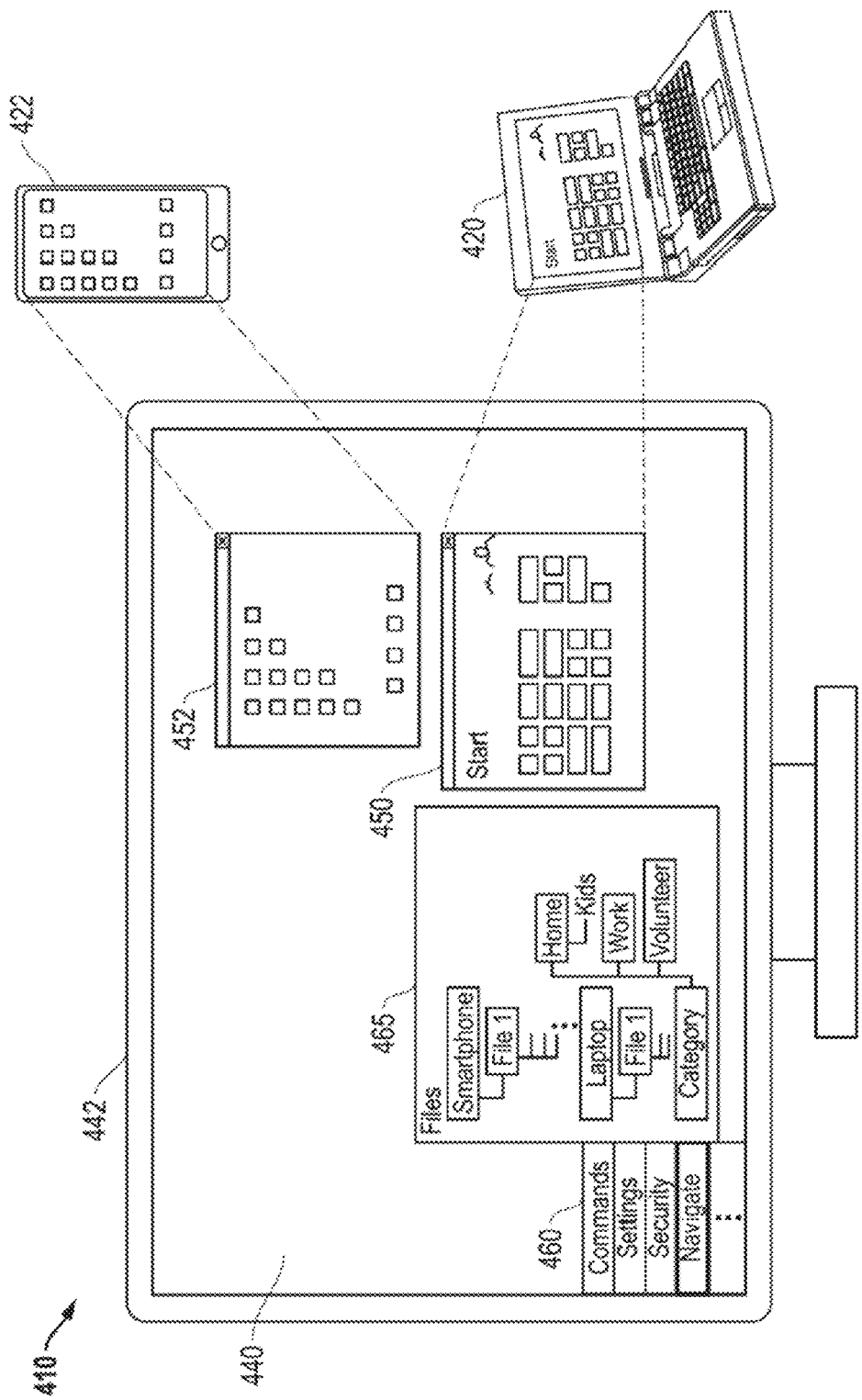
FIG. 4 is a display image diagram illustrating a graphic user interface (GUI) for content sharing system desktop according to an embodiment of the present disclosure.

FIG. 4 is a system 410 depicting content sharing system desktop 440 on a display device 442 associated with a host system of a content sharing system as described in the present disclosure. Remotely connected information handling system 420 is shown with a corresponding device environment-representative window 450. Remotely connected information handling system 422 is shown with a corresponding device environment-representative window 452. In the present embodiment, device environment-representative windows 450 and 452 are shown as having a complete or partial replication of the desktop interface found on the remotely connected information handling systems 420 and 422. A screen scrape of the remotely connected information handling systems 420 and 422 may be used to replicate the remotely connected computing device user interfaces. The content sharing system navigation module may then assist with navigation of the remotely connected information handling systems 420 and 422 via the device environment-representative windows 450 and 452. Icons in the device environment-representative windows may be operated and commands may be executed remotely via a RDP or other virtualization protocol with an execution engine and modification of files may be modified accordingly with the modification engine. In other embodiments, a file tree structure may be used with respect to one or more of the device environment-representative windows instead as described herein.

A file tree structure is shown in 465, but represents navigation and communication with aggregated files received from a plurality of remotely connected information handling systems such as 420 and 422. In FIG. 4, aggregated file tree structure 465 may be organized according to remotely connected information handling system source devices 420 and 422. In another embodiment, aggregated files may be categorized according to a category designation that may be assessed and learned by the content sharing system. For example in an embodiment, categories include home file, a sub file relating to kids, a work file, and a volunteer activity file. Other categorizations are contemplated as is understood. A command bar 460 is also shown in content sharing system desktop 440 and may be supported by the host operating system of the content sharing system of the present disclosures. The command bar 460 may include commands for copying, aggregating, sorting, execution of files and applications of the host for the content sharing system or for remotely connected information handling systems such as 420 and 422. Additionally, command bar 460 may include ways to interface with content sharing system settings, security, or navigation tools for files and data to facilitate the more seamless communication and utilization of files and applications from among the plurality of remotely connected information handling systems. Settings may include preferences relating to auto-initiation of content sharing including identification of remotely connected information handling systems, preferences for aggregation of files, determination of features of the device environment-representative windows, aggregation parameters and categorization selections and other settings. The content sharing system desktop 440 may also have icons (not shown) for initiating various operations of the content sharing system. For example, content sharing system desktop icons may link to external sites for uploading or downloading data or files. In another example embodiment, content sharing system desktop icons may to applications available on the content sharing system or to initiate specific content sharing system functions.

Figure 5:
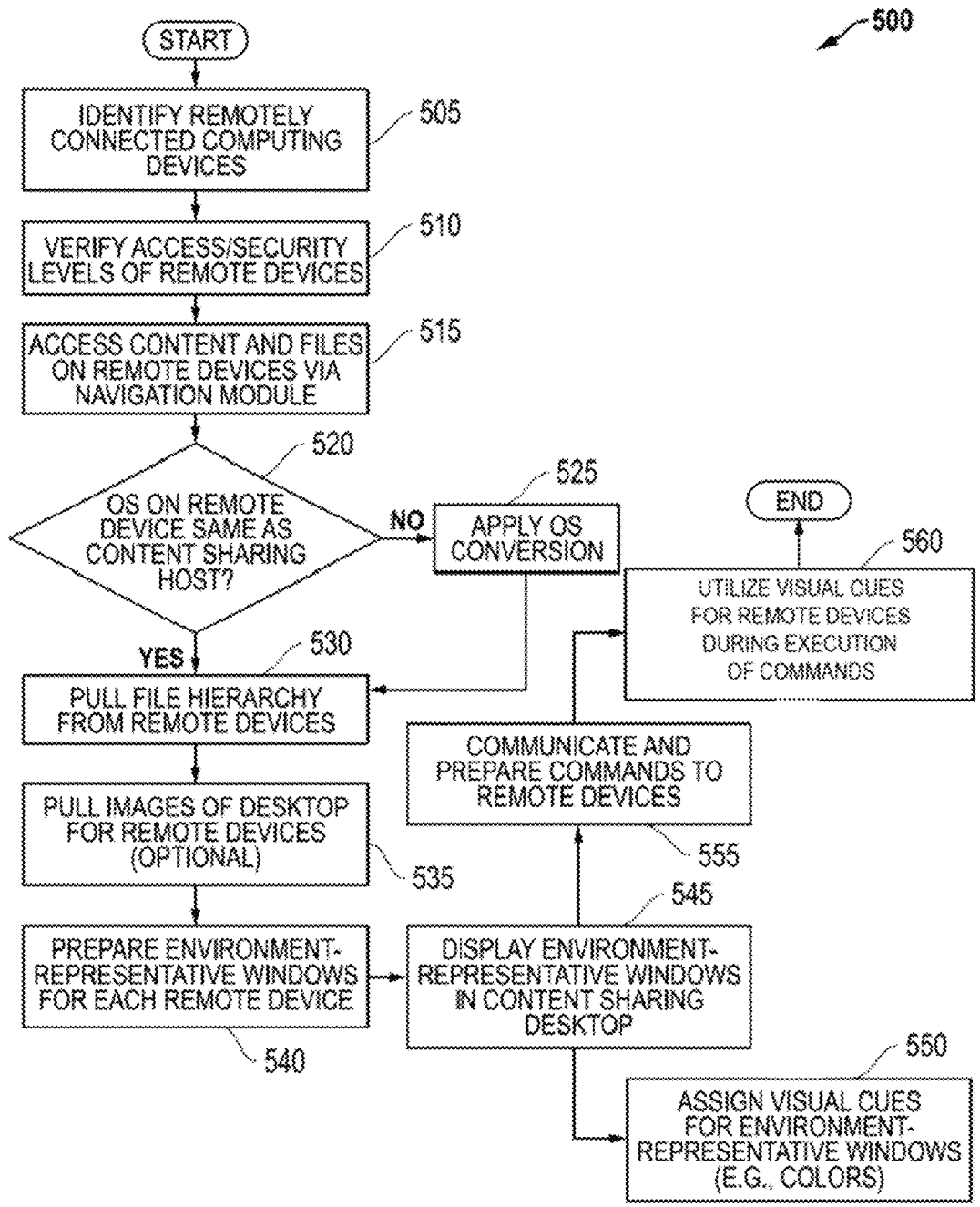
FIG. 5 is a flow diagram illustrating a method of navigation via a content sharing system according to an embodiment of the present disclosure.

FIG. 5 is a flow diagram showing a method of content sharing among remotely connected information handling systems according to an embodiment of the present disclosure. Method 500 begins at block 505. At block 505, the content sharing system identifies remotely connected information handling systems for pairing to the content sharing system. In an example embodiment, the remotely connected information handling systems may be connected wirelessly to the host system for the content sharing system or via a wired connection. Connection may be via a WPAN such as Bluetooth detection or via a WLAN connection or other wireless connections as described herein in certain embodiments. Detection may come about via an identification of remotely connected information handling systems by unique identifiers cross referenced with an approved list of computing devices accessible by the content sharing system. In another example embodiment, application code on a remotely connected information handling system may initiate identification of the connected information handling system as accessible by the content sharing system. In other instances, a user may initiate content sharing at the remotely connecting information handling systems by requesting accessibility to the content sharing system after remote connection to the WPAN or WLAN.

In one example embodiment, the detection and access routine may be auto-initiated upon an information handling system being connected to one or more WPANs or WLANs being monitored by the information handling system. In another example embodiment, the access to a remotely connected computing device may be an auto-initiation upon connection to one or more WPANs or WLANs having a content sharing system. As part of automatic initiation of access to a remotely connected information handling system, an RDP for virtualization of the remotely connected information handling system may be initiated. In other examples, a cookie or other code may be enabled to communicate availability of the remotely connected information handling system to the content sharing system upon connection to a WPAN or WLAN monitored by the content sharing system. In yet other embodiments, the content sharing system may request access to newly connected information handling systems to a monitored WPAN/WLAN if access is not already approved.

Proceeding to block 510, the content sharing system may verify access or security levels set by an administrator of the content sharing system. The access security levels may include security controlling access to the content sharing system by a remotely connected information handling system. Verifying access and security levels at 510 may also include a determination of whether a remotely connecting computing device permits access to its files, and if so, whether some files and applications are restricted. In another embodiment, the content sharing system may determine security risks posed by one or more remotely connecting computing devices to the content sharing system. For example, the content sharing system may determine whether access by a remotely connected information handling systems not behind a firewall may access applications, files and data of another remotely connected computing device under firewall protection. The content sharing system may identify restrictions for cross access between the computing devices or by the content sharing system. It is understood that security and access measures may be taken in accordance with measures understood in the art.

If security is determined acceptable by the content sharing system settings, and access is granted to the content sharing system, the navigation module of the content sharing system may initiate access at block 515 to permitted files and applications on one or more remotely connected information handling systems. Access at block 515 may be via a RDP or other virtualization protocol for example.

Proceeding to decision block 520, the content sharing system will determine whether the OS on the remotely connected information handling system matches that of the content sharing system host. In other embodiments, the content sharing system may determine if the OS of the remotely connected information handling system is compatible with the OS of the content sharing system host computing device. In either embodiment, if the OS is not the same or compatible, the flow proceeds to block 525. At block 525, the content sharing system will utilize its OS conversion protocols to enable communication with or access to applications and files on the remotely connected information handling system. Several example OS conversion protocol embodiments are discussed above. Those, and similarly understood OS conversion protocols, are available for use with the disclosure herein.

Upon implementation of the OS conversion protocol or a determination that the remotely connected information handling system uses a similar or compatible OS to that of the content sharing system host, the flow then proceeds to block 530. At block 530, the content sharing system pulls a hierarchy of files and applications with permitted access from the remotely connected information handling system. The content sharing system navigation module uses this file hierarchy or menu to access files and content on the remotely connected information handling systems.

Flow may proceed to block 535. For embodiments where a computing device environment-representative window replicates a remotely connected information handling system desktop, the content sharing system may pull images of the remotely connected desktop including icons, control bars, and other features at block 535.

The flow proceeds to 540 where this desktop image data may be used to create a content sharing system desktop and interface with the navigation module to establish navigation and control over the remotely connected information handling system via the corresponding device environment-representative windows. As explained, some device environment-representative windows of the content sharing desktop may simply display a file tree hierarchy. Other file and application navigation theme may be used in other embodiments. In embodiments where remotely connected information handling system desktop images are available, the device environment-representative window may replicate all or part of a corresponding remotely connected information handling system desktop.

Proceeding to block 545, the content sharing system may display the device environment-representative windows in the content sharing desktop on a local or remote display associated with the content sharing system.

At block 550 the content sharing system may assign visual cues to the device environment-representative windows. Colors, shading or other visual cues may be used to indicate which device environment-representative windows are active or which windows are currently being utilized via the content sharing system. Other visual cues within the device environment-representative windows may indicate ongoing execution of commands on the remotely connected information handling system, to indicate limited access to files and applications on the remotely connected information handling system, or even to indicate activity of specific applications or files within the device environment-representative windows representing the remotely connected information handling system.

At this point, flow proceeds to block 555 where the content sharing system communicates and prepares commands to the remotely connected information handling systems via a navigation and communication module. Such commands may come via a user using a systems settings user interface of the content sharing system desktop or may be set up as auto initiated by a user or administrator should certain conditions be met. In an embodiment, the navigation module is linked with the device environment-representative windows to permit navigation and communication of commands with a plurality of remotely connected information handling systems of the content sharing system.

Proceeding to block 560, the content sharing system desktop may also use a set of visual cues in the content sharing desktop to indicate when the content sharing system is executing commands on one or more remotely connected information handling systems or functions of the content sharing system such as aggregation. In an example, a visual cue may indicate that a file is or has been copied between two remotely connected information handling systems from one device environment-representative window to another device environment-representative window. In another example, an image, video or audio file may actively be being used via the content sharing system or an application on one remotely connected information handling system may be running and visual cues may indicate the same. In another example embodiment discuss in further detail herein, visual cues may indicate in device environment-representative windows which files or content are aggregated by the content sharing system and how those files are categorized. At this point the flow may end. It is understood that the sequence of steps for the method blocks depicted in FIG. 5 is not limiting and may occur in any order or some blocks may not occur at all during optional embodiments of the present disclosures.

Figure 6:
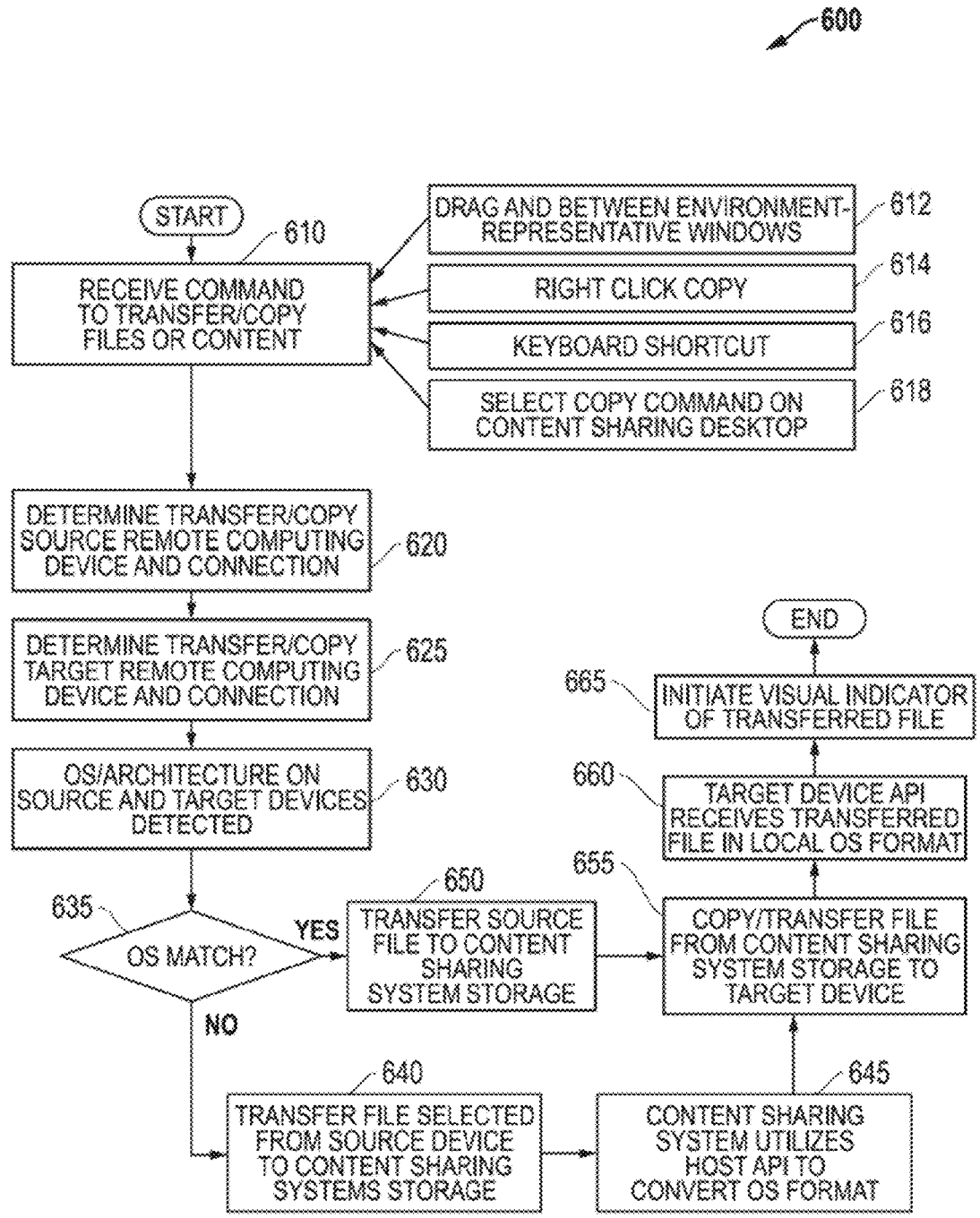
FIG. 6 is a flow diagram illustrating a method of exchange of file content via a content sharing system according to an embodiment of the present disclosure.

FIG. 6 is a flow diagram showing a method for navigation and exchange of shared content via a content sharing system according to an embodiment of the present disclosure. Method 600 begins at block 610 where a command is received via the content sharing system to transfer or copy files and content between a plurality of device environment-representative windows. The content sharing system desktop may facilitate a number of ways for a user to execute a copy or transfer command. For example, a file may be selected in a device environment-representative window and dragged to a second device environment-representative window as in 612. In another example embodiment, a right click copy or transfer command may be received by the content sharing system desktop as in block 614. A keyboard shortcut for copy or transfer may be used in yet another embodiment such as block 616. In yet another embodiment, as in block 618, a copy or transfer command may be selected from a command bar or menu of the content sharing system desktop. Other copy or transfer commands may be indicated by a user through the content sharing system desktop.

Upon receiving a copy or transfer command, the flow proceeds to block 620. At 620, the content sharing system determines the source remotely connected information handling system and the connection with that remotely connected computing device and the content sharing system. Proceeding to block 625, the content sharing system similarly determines the target remotely connected information handling system as a recipient of the transferred or copied content and the connection with that remotely connected system.

Proceeding to 630, the content sharing system determines the OS or system architecture of the source and target remotely connected information handling systems. At decision block 635, the content sharing system determines if there is a match between the OS of the source and target remotely connected information handling systems. Similarly, detection of the system architecture match for the source and target remotely connected information handling systems in another embodiment may be detected to determine if a conversion needs to be made by the OS conversion protocol module of the content sharing system.

If no match of OS, the flow proceeds to 640 where a transferred file is selected from the source remotely connected information handling systems via the navigation module of the content sharing system. The transferred file is stored in shared storage of the content sharing system which may be local or remote storage associated with the hosted content sharing system. Proceeding to 645, the content sharing system utilizes a host API including plug-ins or other available OS conversion protocol features to convert the file format to conform to or work compatibly with the target remotely connected information handling system. In some embodiments, the conversion may be to a standard file format utilized by the host OS for storage as an intermediate step before conversion to an OS type for the target remotely connected information handling system. The flow then proceeds to 655 where the content sharing system executes a copy or file transfer from the content sharing system storage to the target remotely connected information handling system. If the OS matches at decision block 635, the flow proceeds to 650 where the content sharing system stores the transferred file in shared storage of the content sharing system. As before, the flow then proceeds to 655 where the content sharing system executes a copy or file transfer from the content sharing system storage to the target remotely connected information handling system.

Upon execution of the copy or transfer of the transferred file to the target remotely connected information handling system, the target remotely connected information handling system receives the transferred file via an API in local OS format at 660. Proceeding to 665, the content sharing system then initiates a visual cue at the source and/or target device environment-representative windows in the content sharing system desktop to indicate the change in status of the file or execution of the transfer command. At this point the flow may end. It is understood that the sequence of steps for the method blocks depicted in FIG. 6 is not limiting and may occur in any order or some blocks may not occur at all during optional embodiments of the present disclosures.

Figure 7:
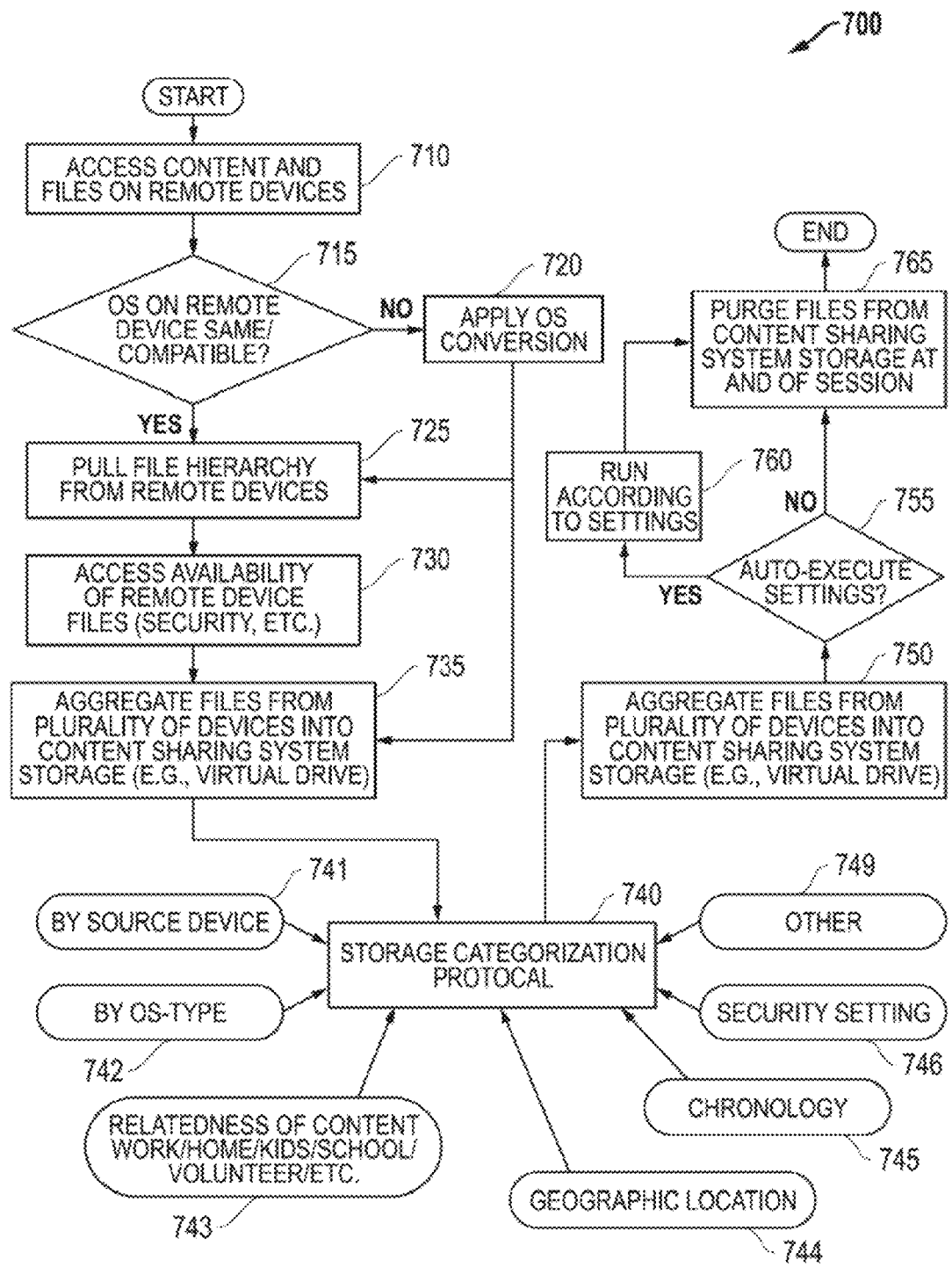
FIG. 7 is a flow diagram illustrating a method of aggregation and organization of file content from a plurality of remotely connected computing devices via a content sharing system according to an embodiment of the present disclosure.

FIG. 7 is a flow diagram showing a method for navigation and aggregation of shared content via a content sharing system according to an embodiment of the present disclosure. Method 700 begins at block 710 where the content sharing system gains access to content and files on a plurality of remotely connected information handling systems in accordance with the above described disclosure. In an example embodiment, a navigation module of the content sharing system obtains successful access to the remotely connected information handling systems. This enables navigation of available files on the remotely connected information handling systems via the content sharing system. In an embodiment, the access is auto-initiated as described above.

Proceeding to decision block 715, the content sharing system determines whether the OS on the remotely connected information handling systems yielding access to files and content are the same or compatible to the OS of the host of the content sharing system. If not, the flow proceeds to block 720, where one or more OS conversion protocols are implemented by the content sharing system to make access of the files and content available to the navigation module. The flow proceeds to block 725 after OS conversion. Alternatively, if an OS match or compatibility is found in decision block 715 flow proceeds to block 725.

At block 725, the content sharing system pulls file hierarchies from a plurality of remotely connected information handling systems. This may be used, as in other embodiments, to generate device environment-representative window in the content sharing system desktop.

Proceeding to block 730, the content sharing system may determine which files and content are not restricted by security measures implemented by the remotely connected information handling systems or instituted by the content sharing system to prevent cross accessibility between computing devices. For example, the content sharing system may restrict access between remotely connected information handling systems having differing security levels such as firewall protections or the like by determining the security status of the plurality of remotely connected information handling systems.

The flow proceeds to 735 where the content sharing system utilizes a file aggregator to pull accessible files and content from a plurality of remotely connected information handling systems. The files and content copied from the plurality of remotely connected information handling systems may be stored into a remote or local shared storage for the content sharing system.

Proceeding to block 740, a categorization engine of the content sharing system may be initiated. The content sharing system will begin a shared storage categorization protocol according to settings of a user or administrator of the content sharing system. Several categorization themes are shown as example embodiments. At 741, the aggregated files may be categorized and sorted by type of remotely connected information handling system to source the files. At 742, the aggregated files may be categorized and sorted by OS-type of the originating remotely connected information handling systems. At 743, the aggregated files may be categorized and sorted by relatedness of content. Example relatedness categories may be files associated with work, home, kids, school, volunteer activities, hobbies, and so forth. Determination of categorizing these files may come from determination of a number of factors as described above including chronology, location, source computing devices, metadata clues, file types or application types used to run those files, content clues such as names or other descriptive terms to name a few example criterion for determining relatedness categorizations. At 744, the aggregated files may be categorized and sorted by geographic location of where files were created. For example, geotag information may be used to categorize files. At 745, the aggregated files may be categorized and sorted by chronology based on timestamps relating to file creation. This may be varied according to earliest creation time of files, latest versions, or other timestamp factors of any time in between. At 746, the aggregated files may be categorized and sorted by security setting levels whereby files may be ranked by sensitivity of content. This may include determining sensitivity levels for files based on protection behind one or more firewalls, encryption, pass code protection, designation in the files, or other security factors. At 749, it is contemplated that the aggregated files may be categorized and sorted by any number of other categorization approaches. This may include multiple combinations of the recited bases for categorization of aggregated files and additional sorting and categorizations commonly used with varying file types likely to be aggregated from the plurality of remotely connecting information handling systems.

The flow proceeds to block 750 where files are aggregated by a file aggregator of the content sharing system by copying the accessible files from a plurality of remotely connected information handling systems into a shared memory of the content sharing system. The categorization engine applies a categorization protocol as described above to sort the aggregated files from the plurality of remotely connected information handling systems into a navigable hierarchy of files and sub-files arranged by the aggregation engine. The content sharing system makes the aggregated files navigable and accessible by users of the system. In an example embodiment, navigation of the aggregated files may be via a file hierarchy on the content sharing system desktop. In other embodiments, which may depend on security settings amongst the plurality of remotely connected information handling systems, the aggregated files may be navigated from one or more remotely connected information handling systems via the content sharing system. In this way, organization and navigation of files from a plurality of remotely connected information handling systems, some with varying OS and file architectures, may be accessed more seamlessly via one location. In another example embodiment, the aggregation of permitted files from the remotely connected information handling systems may be auto-aggregated upon detection of the remotely connected information handling system via the WPAN, WLAN or other network connection by the content sharing system. In various embodiments, auto-aggregation may take place upon similar connection identification techniques to those described elsewhere with respect to initiation of a navigation module of the content sharing system. For example, auto-aggregation may occur by detection of a connection and sending a request for access to a remotely connecting information handling system. In other examples, a list of systems with unique identifiers that may be remotely connected to the content sharing system may be stored by the content sharing system and auto-initiate aggregation should a unique identifier match. It is understood that each remotely connected information handling system may have a plurality of unique identifiers depending upon the network type through which it is connected. For example, a WPAN identifier may be different from a WLAN identifier. In other instances they may be the same. In yet another embodiment, software code such as an application or cookie on a remotely connected information handling system may identify that the system is accessible by the content sharing system upon connection.

The flow proceeds to decision block 755 where the content sharing system determines whether auto-execution settings for applications and files from one or more remotely connecting information handling systems have been triggered. If so, the flow proceeds to block 760 where the content sharing system provides for execution of commands according to the settings of a user or an administrator to run a program or application. The program or application may be run by a remote desktop protocol or similar system for virtual control over a remotely connected information handling system. In other instances, the program or application may be run directly from the host system for the content sharing system. The files utilized by a program or application whether run through a remotely connected information handling system or on a host computing device of the content sharing system may be sourced from the aggregated files of the shared memory for the content sharing system. In other embodiments, the files on one or more remotely connected information handling systems may be used during auto-execution of programs or applications.

After auto-execution of programs or applications occurs, or if no auto-execution is detected, the content sharing system may proceed to a condition where the session with the content sharing system ends. This may occur via user or administrator ending the content sharing system at the host in an example embodiment. In other embodiments, the connection by a remotely connected information handling system may be terminated ending that remotely connected information handling system interface with the content sharing system. In yet other embodiments, the content sharing system may be ended automatically. For example, there may be a limitation on time periods for operation of a content sharing system with remotely connected information handling systems. In such an instance upon expiration of time, the content sharing system session may be ended automatically.

Proceeding to block 765 upon ending of a session with the content sharing system, the content sharing system may purge the aggregated files in shared storage copied from some or all remotely connected information handling systems. In the example of one or more individual remotely connected information handling systems terminating interface with the content sharing system, files and content aggregated from those terminated remotely connected information handling systems may be purged from the shared storage in an example embodiment. In other embodiments of the present disclosure, it may be desirable to host the aggregated files by the content sharing system even after one or more remotely connected information handling systems has terminated an interface. The aggregated files and content may continue to be reviewed and utilized in a number of capacities by a user. In an example embodiment of such a scenario, retention of aggregated files and content may be limited to situations where the remotely connected information handling systems are all owned or controlled by one user, household, business, or other organization where sharing content from multiple remotely connected information handling systems is desired. Upon ending a session of the content sharing system by the host, all aggregated files and content may be purged in certain embodiments. At this point the flow may end. It is understood that the sequence of steps for the method blocks depicted in FIG. 7 is not limiting and may occur in any order or some blocks may not occur at all during optional embodiments of the present disclosures.

In accordance with at least one aspect, a user can coordinate a wide variety of content from a variety of devices that may have disparate hardware requirements, software architecture, or distinct operating systems (OS). For example, auto-initiation of access to remotely connected information handling systems to a content sharing system via a WPAN or WLAN enables immediate and more seamless navigation and operation of content and files from the variety of devices via a single desktop. On the content sharing system desktop, device environment-representative windows make available navigation of permitted content and files from the variety of corresponding devices in one location. In some embodiments, shared memory is available for manipulation, execution, or navigation of the files and content shared via the content sharing system described in the present disclosure.

In accordance with another aspect, a user can coordinate a wide variety of content from a variety of devices that may have disparate hardware requirements, software architecture, or distinct operating systems (OS) via aggregation and categorization of files from the plurality of remotely connected devices. For example, auto-initiation of aggregation of files and content from the remotely connected information handling systems to a content sharing system via a WPAN or WLAN enables immediate assessment of content and files from the variety of devices via a single desktop according to desired categories. On the content sharing system desktop, device environment-representative windows make available access and modification of permitted content and files from the variety of corresponding devices in one location and easy comparison of related content aggregated at the content sharing system. In some embodiments, shared memory is available for aggregation, manipulation, execution, or navigation of the aggregated files and content shared via the content sharing system described in the present disclosure.

In accordance with yet another aspect, the content sharing system communicates via one user interface content sharing system desktop the shared content made accessible from a wide variety of content from a variety of devices that may have disparate hardware requirements, software architecture, or distinct operating systems (OS). Visual cues facilitate navigation, execution, manipulation, aggregation and other features made available in one location via the content sharing system of the present disclosure. This visual cues may include colors, highlighting, icons, active icons, movement of features of the device environment-representative windows, file tree hierarchies, command bars, or icons available on the content sharing system desktop.

In the embodiments described herein, an information handling system includes any instrumentality or aggregate of instrumentalities operable to compute, classify, process, transmit, receive, retrieve, originate, switch, store, display, manifest, detect, record, reproduce, handle, or use any form of information, intelligence, or data for business, scientific, control, entertainment, or other purposes. For example, an information handling system can be a personal computer, a consumer electronic device, a network server or storage device, a switch router, wireless router, or other network communication device, a network connected device (cellular telephone, tablet device, etc.), or any other suitable device, and can vary in size, shape, performance, price, and functionality.

The information handling system can include memory (volatile (e.g. random-access memory, etc.), nonvolatile (read-only memory, flash memory etc.) or any combination thereof), one or more processing resources, such as a central processing unit (CPU), a graphics processing unit (GPU), hardware or software control logic, or any combination thereof. Additional components of the information handling system can include one or more storage devices, one or more communications ports for communicating with external devices, as well as, various input and output (I/O) devices, such as a keyboard, a mouse, a video/graphic display, or any combination thereof. The information handling system can also include one or more buses operable to transmit communications between the various hardware components. Portions of an information handling system may themselves be considered information handling systems.

When referred to as a "device," a "module," or the like, the embodiments described herein can be configured as hardware. For example, a portion of an information handling system device may be hardware such as, for example, an integrated circuit (such as an Application Specific Integrated Circuit (ASIC), a Field Programmable Gate Array (FPGA), a structured ASIC, or a device embedded on a larger chip), a card (such as a Peripheral Component Interface (PCI) card, a PCI-express card, a Personal Computer Memory Card International Association (PCMCIA) card, or other such expansion card), or a system (such as a motherboard, a system-on-a-chip (SoC), or a stand-alone device).

The device or module can include software, including firmware embedded at a device, such as a Pentium class or PowerPC™ brand processor, or other such device, or software capable of operating a relevant environment of the information handling system. The device or module can also include a combination of the foregoing examples of hardware or software. Note that an information handling system can include an integrated circuit or a board-level product having portions thereof that can also be any combination of hardware and software.

Devices, modules, resources, or programs that are in communication with one another need not be in continuous communication with each other, unless expressly specified otherwise. In addition, devices, modules, resources, or programs that are in communication with one another can communicate directly or indirectly through one or more intermediaries.

Although only a few exemplary embodiments have been described in detail herein, those skilled in the art will readily appreciate that many modifications are possible in the exemplary embodiments without materially departing from the novel teachings and advantages of the embodiments of the present disclosure. Accordingly, all such modifications are intended to be included within the scope of the embodiments of the present disclosure as defined in the following claims. In the claims, means-plus-function clauses are intended to cover the structures described herein as performing the recited function and not only structural equivalents, but also equivalent structures.

What is claimed is:

1. A method comprising:
executing instructions, via a processor, for a content sharing system having mixed operating system capabilities;
detecting pre-paired wireless connectivity and determining remotely connected computing device authorization for access with the content sharing system;
auto-initiating navigation accessibility within authorized remotely connected computing devices via the content sharing system; and
aggregating data files from the authorized remotely connected computing devices and organizing the data files into categories of work-related file designation and personal file designations based on source or content of the data files; and
displaying, via a display device, a content sharing system desktop comprising the data file categories representing file structures corresponding to the authorized remotely connected computing devices;
wherein at least two authorized remotely connected computing devices function via different operating systems.

2. The method of claim 1 further comprising:
detecting pre-paired wireless connectivity for a second group of remotely connected computing devices for viewing files via the content sharing system without authorization for navigation access with the content sharing system.

3. The method of claim 1 further comprising:
displaying, via a display device, a content sharing system desktop comprising device environment-representative windows to provide navigation access to file structures of the plurality of remotely authorized connected computing devices via an operating system conversion protocol.

4. The method of claim 3 further comprising:
initiating an exchange of file content between the plurality of authorized remotely connected computing devices via a drag-and-drop of files between the device environment-representative windows in the content sharing system desktop.

5. The method of claim 3 further comprising:
retrieving screen desktop display data from authorized remote computing devices for redisplay in device environment-representative windows of the content sharing system desktop,
wherein the remote computing device desktops redisplayed are interactive in the device environment-representative windows of the content sharing system desktop.

6. The method of claim 1 further comprising:
executing operations on files from a plurality of the authorized remotely connected computing devices via the content sharing system desktop.

7. The method of claim 1 further comprising:
terminating navigation accessibility within authorized remotely connected computing devices via the content sharing system upon expiration of a content sharing session.
retrieval of data files from the plurality of remotely connected computing devices for aggregation by the content sharing system;
organizing aggregated data files into categories in the content sharing system according to common characteristics of the aggregated data files.

8. An information handling system comprising:
a processor executing instructions for a content sharing system having mixed operating system capabilities;
the processor detecting pre-paired wireless connectivity and determining remotely connected computing device authorization for access with the content sharing system;
the processor auto-initiating navigation accessibility within a plurality of authorized remotely connected computing devices via the content sharing system; and
a display for displaying a content sharing system desktop comprising the data file categories representing file structures corresponding to the authorized remotely connected computing devices,
wherein at least two of the plurality of authorized remotely connected computing devices function via different operating systems.

9. The information handling system of claim 8 further comprising:
the display device displaying environment-representative windows in the content sharing system desktop to provide navigation access to file structures of the plurality of remotely authorized connected computing devices via an operating system conversion protocol.

10. The information handling system of claim 8 wherein the navigation accessibility within the plurality of authorized remotely connected computing devices via the content sharing system is terminated upon termination of a content sharing session.

11. The information handling system of claim 8 wherein the processor further executes instructions to exchange file content between at least two of the plurality of authorized remotely connected computing devices via the content sharing system desktop.

12. The information handling system of claim 8 further comprising:
the processor executing operations on a file from one of the plurality of the authorized remotely connected computing devices via the content sharing system desktop; and
the display displaying a visual indicator that the operation has been conducted on the content sharing system desktop.

13. The information handling system of claim 12 wherein the visual indicator is a color change to a representation of the file in the content sharing system desktop on which the operations are being executed.

14. The information handling system of claim 8 further comprising:
the processor receiving a command from a first authorized remotely connected computing device to perform an operation on a file from a second authorized remotely connected computing device;
the processor executing the operations on the file from the second authorized remotely connected computing device via the content sharing system; and
the content sharing system accessing a virtual memory to facilitate the operation on file content between the plurality of remotely connected computing devices.

15. An information handling system comprising:
a processor executing instructions for a content sharing system having mixed operating system capabilities;
the processor detecting pre-paired wireless connectivity and determining remotely connected computing device authorization for access with the content sharing system;
the processor auto-initiating navigation accessibility within a plurality of authorized remotely connected computing devices via the content sharing system;
a display for displaying a content sharing system desktop comprising data file categories representing file structures corresponding to the authorized remotely connected computing devices;
the processor performing an operation on a file from one of the authorized remotely connected computing devices via the content sharing system,
wherein at least two of the plurality of authorized remotely connected computing devices function via different operating systems.

16. The information handling system of claim 15 wherein the content sharing system provides navigation access to the file structures of the plurality of authorized remotely connected computing devices via an operating system conversion protocol.

17. The information handling system of claim 15 further comprising:
the display for displaying a content sharing system desktop comprising a representation of files available to be navigated within the plurality of authorized remotely connected computing devices.

18. The information handling system of claim 15 wherein the content sharing system further organizes files from the plurality of authorized remotely connected computing devices into navigable file structures according to common characteristics of the files from the plurality of authorized remotely connected computing devices.

19. The information handling system of claim 15 wherein the content sharing system is declined navigation access to high security files designated in at least one of the plurality of authorized remotely connected computing devices.

20. The information handling system of claim 15 wherein the content sharing system provides navigation access via a content sharing system desktop only to files with usage relatedness designated as work related files from the plurality of authorized remotely connected computing devices.

* * * * *